J. PRIMOS.
BENCH DOG.
APPLICATION FILED NOV. 21, 1911.

1,023,679.

Patented Apr. 16, 1912.

Witnesses

Inventor
Joseph Primos.
By Victor J. Evans
Attorney

UNITED STATES PATENT OFFICE.

JOSEPH PRIMOS, OF HAMMOND, LOUISIANA.

BENCH-DOG.

1,023,679.  Specification of Letters Patent.  Patented Apr. 16, 1912.

Application filed November 21, 1911. Serial No. 661,526.

*To all whom it may concern:*

Be it known that I, JOSEPH PRIMOS, a citizen of the United States, residing at Hammond, in the parish of Tangipahoa and State of Louisiana, have invented new and useful Improvements in Bench-Dogs, of which the following is a specification.

This invention relates to certain and novel improvements in bench dogs.

In carrying out my invention it is my purpose to provide a simple and effective device of this character which may be applied to any ordinary bench and which may be adjusted to compensate for the various sizes or thicknesses of the material to be operated upon.

I further aim to provide, in a device of this character, simple and effective means for reinforcing as well as for sustaining the biting jaw of the dog at a predetermined elevation with relation to the bench, so that the strain of the jaw proper will be relieved.

With the above recited objects in view, and others of a similar nature the invention resides in the novel construction and arrangement of parts set forth in and falling within the scope of the appended claims.

For the purpose of explaining the invention, the accompanying drawings illustrate a satisfactory reduction of the same to practice, but the important instrumentalities thereof may be varied, and so it is to be understood that the invention is not limited to the specific arrangement and organization shown and described.

Figure 1:
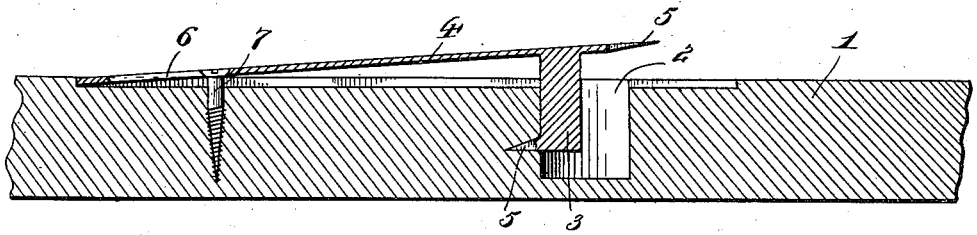
Figure 2:
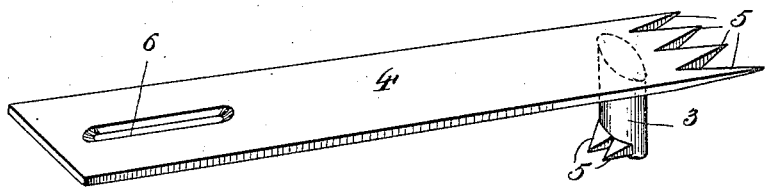

In the drawings, Figure 1 is a longitudinal sectional view of my improvement showing the same in applied position upon a work bench. Fig. 2 is a perspective of the improvement detached.

Referring now to the drawings in detail, the numeral 1 designates a work bench such as is commonly employed in the art of carpentry. The bench 1 has its working face formed with a depression 2, the said depression being adapted to receive the substantially L-shaped offset 3 of a spring dog 4. The offset 3 has its longitudinal portion provided with teeth 5, as has also the substantially rectangular dog proper. The dog proper, may if desired be arranged within a depression provided in the bench 1, and the said dog is formed adjacent its rear extremity or that opposite its teeth 5, with an elongated depression or opening 6. The numeral 7 designates a headed threaded element which is adapted to pass through the opening 6 and to engage a threaded opening provided within the bench.

From the above description, taken in connection with the drawings it will be noted that by releasing the headed threaded element the dog may be forced forward within the opening 2 of the bench so as to bring its offset member out of engagement with the wall provided by the said member, when the spring dog may be raised a desired distance above the surface of the bench and sustained at the said adjustment through the medium of the rearward movement of the dog and the replacing of the screw to sustain the teeth of the offset portion of the said dog into contact with the wall of the opening 2. By this arrangement, it will be noted that the rectangular member of the dog may be adjusted to a nicety with relation to the bench, so as to engage with materials of different sizes to be operated upon.

Having thus described the invention what I claim is:—

1. In a device for the purpose set forth, the combination with a work bench having a recessed portion, of a spring dog for the bench, said dog being formed with an L-shaped portion adapted to be received within the recessed portion of the bench and to engage one of the walls provided thereby, and means for maintaining the said offset portion in an adjusted position with relation to the top of the bench.

2. In combination with a work bench having a recessed portion, of a bench stop comprising a toothed resilient member means retaining the said member upon the bench, and also to permit of the longitudinal adjustment of the said member, said toothed member being provided with a substantially L-shaped depending portion, and the offset arm of the said L-shaped member adapted to engage with one of the walls of the depressed portion of the bench.

3. A bench stop comprising an elongated spring member having one of its ends formed with teeth, the said member being also provided with an L-shaped depending portion arranged adjacent its teeth, and the
5 said spring member having its body formed with an elongated opening, substantially as and for the purpose set forth.

In testimony whereof I affix my signature in presence of two witnesses.

JOSEPH PRIMOS.

Witnesses:
J. W. SMOLLEN,
L. WAHL.

Copies of this patent may be obtained for five cents each, by addressing the "Commissioner of Patents, Washington, D. C."